Sept. 10, 1968    J. D. SEGREDO    3,400,524
ADJUSTABLE COMBINATION GUARD AND LEDGER PLATE
Filed Aug. 31, 1965    3 Sheets-Sheet 1

Inventor:
John D. Segredo
John J. Kowalik
Atty.

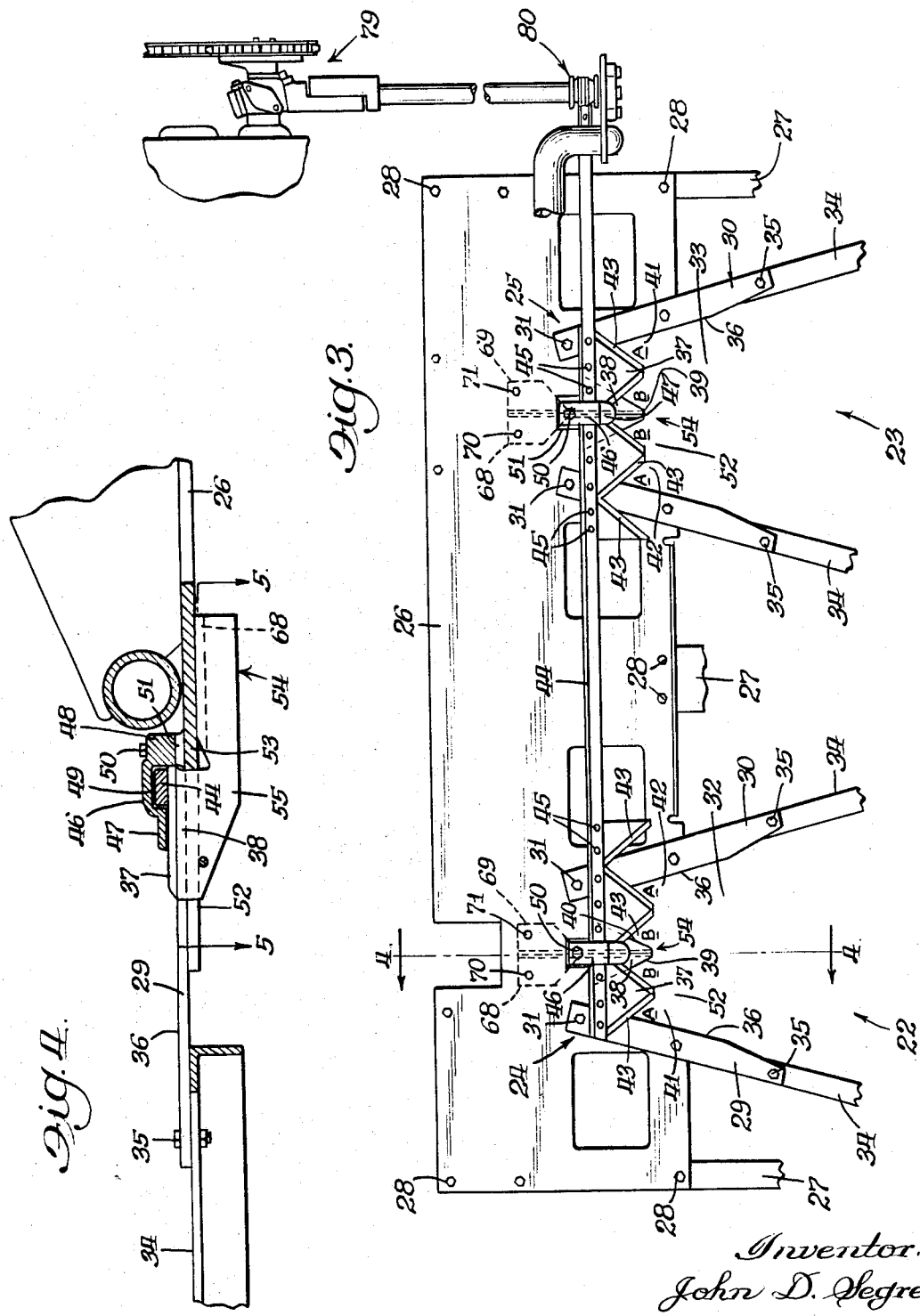

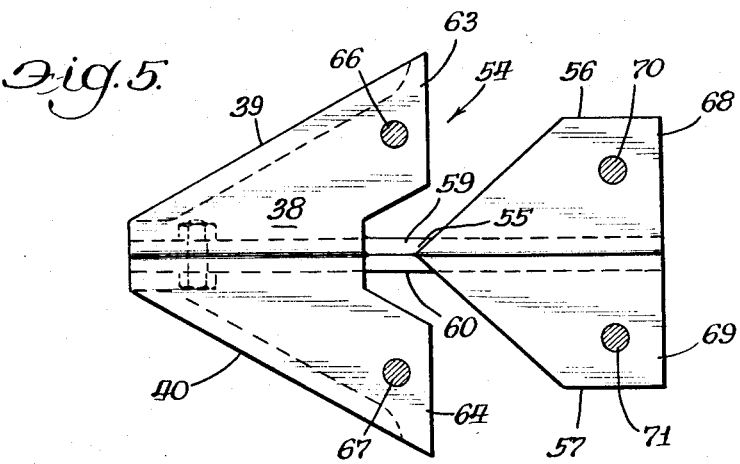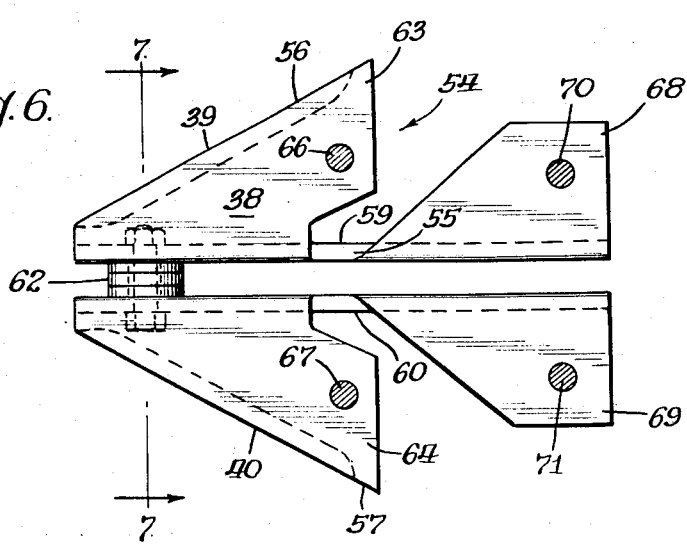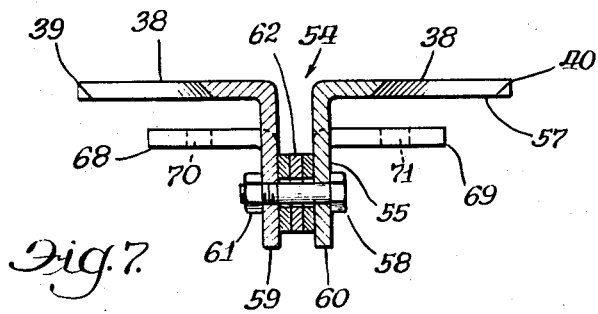

3,400,524
ADJUSTABLE COMBINATION GUARD AND
LEDGER PLATE
John D. Segredo, Chicago, Ill., assignor to International
Harvester Company, a corporation of Delaware
Filed Aug. 31, 1965, Ser. No. 484,012
13 Claims. (Cl. 56—98)

ABSTRACT OF THE DISCLOSURE

A harvester having a pair of relatively reciprocal elements including a sickle and a split guard with cutting portions, the parts of the guard being adjustable lengthwise of the sickle to vary the position of the cutting area therebetween.

---

The instant invention relates to a row crop harvester. Particularly the invention relates to means to enable variable spacing between cutter devices in two or more row units.

A conventional forage harvester, of the class adapted for row crop harvesting of stalk crops—corn, for example—has a plurality of harvesting or row units designed to operate over a field in which crops are planted in rows spaced apart uniformly from each other. In a conventional forage harvester, each row unit comprises a cutter device for severing stalks near the ground. A forage harvester is distinguished from a conventional corn picker in that a conventional corn picker aggressively engages stalks but then snaps the ears from the stalks, no effort being made to sever the stalks.

While an endeavor generally is made, in planting of row crops, to provide for uniform spacing within a given field to maximize harvesting efficiency, spacing of the rows from field to field frequently varies. Moreover, notwithstanding the effort to maintain uniform spacing within a given field, even spacing between the rows within such given field may vary. Generally, in connection with corn, for example, row spacing varies between 30 and 40 inches. Such variation causes a harvesting problem for which accommodation should be made. That is to say, a forage harvester having row units which are set for rows of one spacing will not most efficiently harvest rows having another or different spacing.

Related to the problem of efficiently harvesting from pairs of rows the spacing of which may vary is the problem of harvesting crops from double bed plantings. Double bed planting refers to a practice which is being increasingly employed and is characterized by planting stalk crops in elongated parallel beds. Each bed in essence is a wide crop row the center of which, according to usual practice, may be 36 to 40 inches from the center of an adjoining bed. Each bed comprises a pair of parallel rows which according to usual practice may be spaced 10 inches to 20 inches apart from each other.

Normally, the gathering points of a row unit are sufficiently widely spaced, and of a construction which is adapted, to guide standing stalks of a single row of generally encountered row spacing variation or a double row bed into the throat or stalk-receiving passageway of a harvesting head. Thereby, while all crop may enter a harvesting head, not always a tolerable harvesting job can be done. That is because in the absence of accommodating provision, forage harvesting efficiency varies inversely with the variation of row spacing from the space setting of harvester row units. Accordingly, for double bed planting, harvesting efficiency will be poor for at least two or four rows in a double bed.

To the end that spacing between the cutter devices can be adjusted to provide spacing matching that encountered in the rows being harvested, conventional row units have been provided which are adapted for lateral ajustment. However, such conventional devices are relatively expensive and complicated and operate efficiently only with respect to crops in rows falling along centers of row units. Another prior teaching provides for adjustment of a cutter blade driven about an axis of rotation. However, such construction, while adapted to increase harvesting efficiency with respect to some stalks in a row, upon adjustment causes decreased harvesing efficiency as regards others which are disaligned.

No harvester known and available prior to the present invention has been adapted for efficient harvesting by the cutter device of a row unit of the crops of a double bed, and none has been constructed specifically for that purpose. By providing a solution to that problem, as in the present invention, there moreover have been provided improved solutions to the problem of accommodation of row spacing variation of conventionally planted single rows for efficient harvesting thereof and also to the problem of efficient harvesting of disaligned plants of conventionally planted rows.

In accordance with the instant invention, and as an object thereof, there is provided an improved cutter means adapted for a forage harvester.

Also an object of the invention is the provision of double bed planting harvester means.

An additional object of the present invention is the provision of a cutter device adapted for use in a row unit of a row crop harvester, the cutter device being laterally adjustable to accommodate variation in crop row disposition.

It is another object of the instant invention to provide in a harvester cutter an adjustable combination guard and ledger plate.

It is a further object of the present invention to provide a combination guard and ledger plate construction characterized by a pair of symmetrical portions which are adjustable relative to each other to vary the spacing of the cutting edges of each ledger plate with respect to a pair of stationary cutters.

A yet further object of the instant invention is the provision of a combination guard and ledger plate construction comprising laterally adjustable parts, each of which defines a ledger plate cutting edge, whereby the spacing between an associated pair of ledger plate cutting edges can be selectively varied to adjust the size of a pair of cutting throats of a forage harvester cutter device.

A still further object of the present invention is the provision of means for laterally adjusting the spacing of the cutter devices of a plurality of associated forage row units in accordance with crop row spacing to enable harvesting from twice as many rows as there are row units.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 3 is an enlarged plan view of the associated cutter devices embodying the present invention.

FIG. 4 is a vertical sectional view taken substantially on the line 4—4 of FIG. 3 and looking in the direction of the arrows.

FIG. 5 is a view in the horizontal plane of line 5—5 on FIG. 4 and looking in the direction of the arrows, and showing in plan the combination guard and ledger plate construction embodying the present invention.

FIG. 6 is a view similar to FIG. 5, however showing the guard and ledger plate components in adjusted or laterally spaced-apart disposition.

FIG. 7 is a sectional view taken substantially on the line 7—7 of FIG. 6 and looking in the direction of the arrows.

Figure 1:
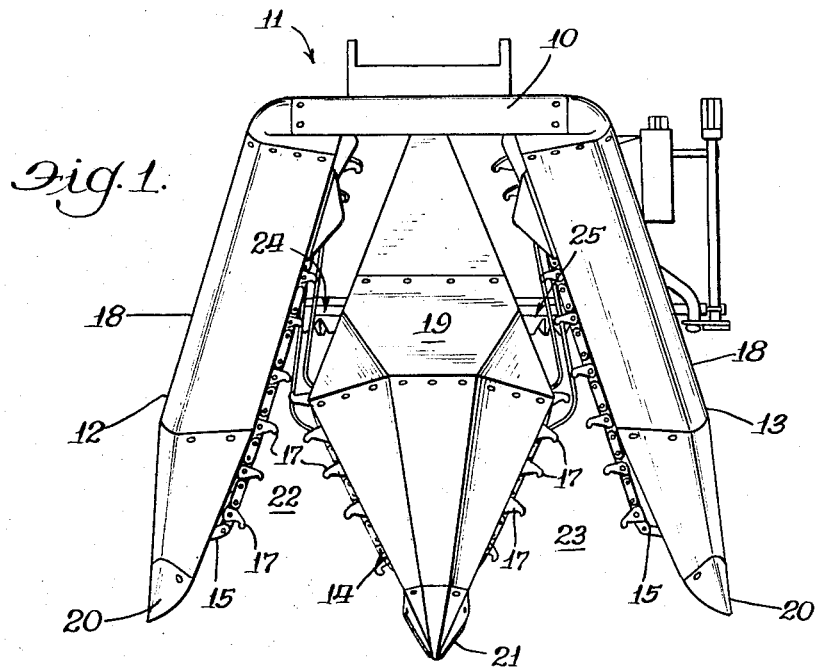
FIG. 1 is a top plan view of the gatherer points of a two-row forage harvester having a pair of associated cutter devices embodying the present invention.
Figure 2:
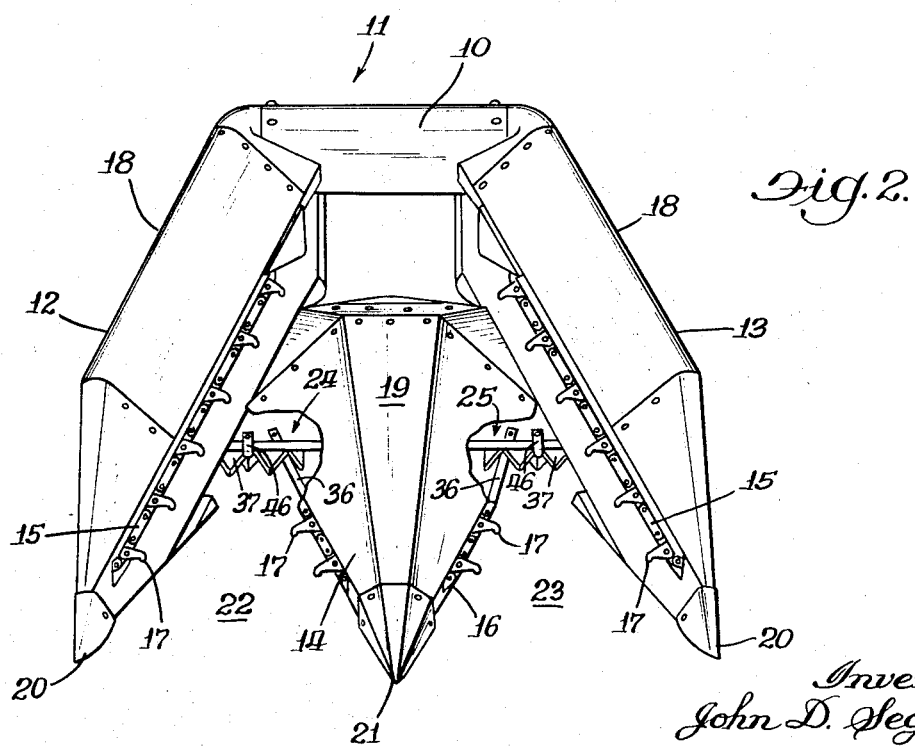
FIG. 2 is a front elevational view of the gatherer points illustrated in FIG. 1.

Referring now more particularly to FIGS. 1 and 2, there are shown the forward end portions or head 11 of what may be considered a conventional two-row forage harvester which comprises a pair of associated row units with side dividers 12 and 13. Each of the side dividers 12 and 13 is adapted to engage outside of a respective single row or bed of a pair of conventionally spaced adjacent crop rows or elongated beds, whereby a pair of conventional crop rows or beds may be embraced during harvesting. The dividers 12 and 13 extend upwardly and rearwardly with their rear end portions being rigidly secured in fixed relationship relative to each other by means of a sheet metal structural part or spacer 10, to the end that the lateral spacing of the dividers 12 and 13 corresponds generally to the width between conventional rows or beds, whereby a pair of conventional rows or beds will be embraced by the dividers 12 and 13 as the harvester 11 advances in a field to be harvested.

A center divider 14 is mounted between the side dividers 12 and 13, and it, too, slopes upwardly as it extends rearwardly. The center divider 14 is adapted to be driven in an aisle between parallel conventionally spaced rows or beds of crops to be harvested, and serves to separate disaligned stalks into respective rows, to the end that efficient harvesting is maximized.

Herein, what is referred to as a "conventional row" is a crop arrangement resulting from a line of plantings spaced between 30 and 40 inches from an adjacent conventional row. A conventional row is distinguished from a row in a bed. A "bed" as used herein is a crop arrangement resulting from a plurality of lines of plantings spaced 10 to 20 inches apart and resulting in rows within a bed. The spacing between the centers of beds is usually the same as the spacing between conventional rows, namely 30 to 40 inches.

As illustrated in FIGS. 1 and 2 each of the dividers 12 and 13 comprises a hood 18 which may be fabricated from sheet metal or the like and which tapers forwardly to a conventional ground-engaging side shoe or pointer 20. The center divider 14 is likewise characterized by a hood 19 which may be fabricated from sheet metal or the like and which tapers centrally and forwardly to a forward end portion on which there is mounted a center shoe or pointer 21. Thereby, there are defined a pair of forwardly diverging crop-receiving aisles 22 and 23 which extend longitudinally—that is, in fore-to-aft relationship—said aisles converging rearwardly.

Each of the crop-receiving aisles 22 and 23 is limited by a pair of endless gatherer chains 15 and 16 which are disposed in operative alignment for aggresively feeding stalks and the like rearwardly as the harvester head 11 advances in the field being harvested. The gatherer chain 16 may be conventionally mounted on the divider 14 in a manner such that its gathering lugs 17 extend into the aisles 22 and 23 from opposite sides of the divider 14, as illustrated in FIGS. 1 and 2. The gatherer chains 15 are operably mounted on their respective dividers 12 and 13 in gathering disposition, said chains 15 being partially covered by the hoods 18 from beneath which the gathering lugs or teeth 17 of said chains 15 project into the aisles 22 and 23, as illustrated.

By reason of the foregoing arrangement of parts, stalk crops can be aggressively fed toward a pair of cutter devices generally designated by the numerals 24 and 25. Each of said cutter devices is associated with a harvester row unit and adapted for harvesting of crops in one of a pair of adjacent conventional crop rows or beds. As illustrated in FIGS 3 and 4, the cutter devices 24 and 25 may be substantially the same in details of construction, differing only as illustrated or indicated.

Each of the cutter devices 24 and 25 is disposed at and defines the inner or aft end portion of a respective of the aisles 23 and 23, said cutter devices 24 and 25 adapted for disposition during harvesting adjacent the ground, whereby maximum crop recovery can be achieved. The cutter devices 24 and 25 are mounted on a fore end portion of a crop deck or table 26 over which crop severed by said cutter devices 24 and 25 passes toward the body of the harvester on which said deck is carried. The crop deck 26 is elongated, with its longitudinal axis extending transversely of the normal path of movement of the harvester on which the same is mounted. As illustrated in FIG. 3, said crop deck 26 may be supported in operable position by conventional means such as frame parts 27, only a portion of which are shown in FIG. 3, and to which frame parts the crop deck 26 is secured by means of fasteners designated 28 and only some of which have been numbered.

As illustrated in FIG. 3, each of the cutter devices 24 and 25 comprises a pair of fixed cutter side blades 29 and 30 which have inner or aft end portions which are secured to the deck 26 by means of fasteners designated 31. The fixed blades are disposed angularly in spaced-apart relationship and project forwardly from the fore end of crop deck 26, the fixed blades 29 and 30 of each pair thereof diverging forwardly, whereby a pair of mouths 32 and 33 are formed which are co-extensive with and disposed at the inner end portions of the aisles 22 and 23, respectively, from which crop will be guided into said mouths 32 and 33. At their forward end portions, the blades 29 and 30 are rigidly secured to relatively stationary frame members 34 by means of fasteners 35.

Each of the stationary or fixed blades 29 and 30 has an inwardly facing knife edge 36 across which a reciprocated knife or sickle section 37 is mounted in cutting relationship. As illustrated in FIG. 3, a knife or sickle section 37 is associated with each row unit—that is to say, with each pair of fixed blades 29 and 30—as illustrated in FIG. 3.

A ledger plate assembly generally designated as 38 is disposed medially of the blades 29 and 30 of each pair, with each of such ledger plates 38 projecting outwardly from the crop deck 26 into the aft end portion of a respective of the mouths 32 and 33. Each ledger plate is disposed substantially in the same transverse plane as the fixed blades of its associated pair 29 and 30 thereof, and has a pair of forwardly converging sharpened or side cutting edges 39 and 40, whereby there are formed in each of the cutter devices 24 and 25 a pair of neck passages 41 and 42 disposed at, defining and co-extensive with the rear end portion of each of the mouths 32 and 33. That is to say, between each pair of fixed blades 29 and 30 there is formed a lateral neck passage 41 and a medial neck passage 42, with each lateral neck passage being defined by the knife edge 36 of a respective fixed blade 29 and the ledger plate edge 39, and each medial neck passage 42 being defined by the edge 36 of a corresponding blade 32 and the associated ledger plate edge 40, as illustrated in FIG. 3.

The foregoing arrangement of parts of each cutter device provides on the top surfaces of the fixed blades 29 and 30 and the ledger plate 38 a slide across which a sickle or knife section 37 is reciprocative to cause shearing action along the edges 36 of the fixed blades 29 and 30 and the edges 39 and 40 of the ledger plate 38 to cut crop disposed in throats A and B into which each of neck passages 41 and 42 is divided by its sickle or knife section 37.

As illustrated in FIGS. 3 and 4, the sickle or knife sections 37 are flat and disposed in a plane parallel to the plane of the deck 26. The knife or sickle sections 37 may be elongated, with their longitudinal axes extending transversely of the direction of the path to be taken during harvesting. The sickle or knife sections have a saw-tooth construction defining a plurality of side cutting edges 43, only some of which have been numbered in FIG. 3 to minimize crowding. Adjoining cutting edges 43 converge forwardly and rearwardly to provide V-shaped saw-teeth projected forwardly from said deck 26.

The means for reciprocating the sickle or cutting sections 37 comprises an elongated sickle bar 44, the longitudinal axis of which extends transversely of the direction of the path in which the harvesting device embodying the present invention is adapted to move during harvesting. By means of a plurality of fasteners 45, only some of which have been numbered in FIG. 3, the aft end portions of the sickle or cutting sections 37 are rigidly secured to the sickle bar 44 from which said cutting sections project forwardly in spaced apart relationship longitudinally of said sickle bar 44.

A plurality of guide members or bosses 46 having fore end portions 47 disposed against the top surface of a respective sickle or cutting section 37, and aft end anchoring flanges 48, respectively, define therebetween aligned grooves or slots 49 to provide a track in which the sickle bar 44 is reciprocative laterally, as illustrated in FIGS. 3 and 4. As illustrated in FIG. 3, each boss or guide 46 is secured in its respective position by means of a bolt or screw 50 which connects its anchoring flange 48 to a saddle or mounting boss 51 which extends upwardly from the surface of the deck 26, as illustrated in FIG. 4.

A conventional sickle drive generally designated by the numeral 80 is operably connected to the sickle bar 44 and adapted to reciprocate the same laterally—that is, from side to side, with respect to FIG. 3. The sickle drive 80 is operably connected by means which may include a conventional linkage 79 connected in the power train to the engine of the vehicle in connection with which the instant invention employed. Either the details of construction of the harvester in connection with which the instant invention is employed or the sickle drive and power train thereto may be altered in accordance with convenience, as their details of construction are not intended as limitations on the invention herein presented.

In the instant embodiment of the invention, the deck 26 has a pair of laterally spaced recesses 52 which accommodate the cutter devices 24 and 25, respectively, such recesses partially defining the aisles 22 and 23, and the neck passages 41 and 42 into which said aisles are divided, as illustrated in FIG. 3. Only one of the recesses 52 is identified by numeral in FIG. 4. The marginal portion 53 of the deck 26 defining the aft end of each of said recesses serves as a finger bar for connection of respective of a pair of combination guard and ledger plate constructions generally designated by numeral 54 in FIGS. 3 and 4. Each combination guard and ledger plate comprises the ledger plate 38 heretofore defined, and an integral guard portion 55, as illustrated in FIGS. 4–7, inclusive.

By combining the guards and ledger plates, means for easy lateral adjustment of the cutting edges 39 and 40 of said ledger plates are provided. That is to say, inasmuch as each ledger plate 38 carries its own guard 55, rapid adjustments of each of the combination guard and ledger plates from side to side, with respect to FIG. 3, are facilitated. Thereby, spacing of the ledger plates 38 can be most advantageously arranged to accommodate spacing between crops of conventional rows or the centers of beds depending on the character of the field being harvested.

The concept is more easily understood by assuming first that conventional crop rows are being harvested and are spaced apart a distance in which maximum harvesting efficiency is achieved when the ledger plates 38 are centered, as in FIG. 3. That is to say, the conventionl crop rows may be spaced apart by a distance which is equal to the sum of the distance between the centers of the neck passages 42 plus one-half of the distances between the centers of such neck passages 42 and the ledger plate edges 40. With such row spacing, the cutting edges 40 will sever aligned stalks along or adjacent the ground. Stray plants or disaligned plants will be cut along the edges 36 and 39 as the sicke sections 37 reciprocate.

Now then, assume that the spacing of the conventional rows lessens to a distance in which most efficient cutting is procured by moving the cutting edges 40 toward each other, which is to say, by moving the ledger plates 38 medially to narrow the neck passages or segments 42. Should the ledger plates be moved in toto to accommodate such lessened row spacing, then the neck passages or segments 41, accordingly, would be enlarged laterally. By thus widening the neck passages 41, the likelihood of efficient cutting of therein-entering disaligned plants is minimized, as increased portions of such disaligned plants would be spaced farther from cutting edges 36 of the fixed blades 29 and the cutting edges 39.

Assume, further, that the spacing of the conventional crop rows being harvested is such that most efficient harvesting results occur when the spacing between the ledger plates 38 is widened from that shown in FIG. 3. Upon such widening to narrow the neck passages 41, provided, that the ledger plates were moved only laterally, the widths of the neck passages 42 would increase. Accordingly, less efficient harvesting would occur with respect to crop entering the passages 42, as there would be an increase in the number of plants that would have to be dragged to the cutting edges 40 and to the cutting edges 36 of the fixed blades 30.

To the end that harvesting efficiency is procured—that is, to the end that effective cutter device adjustment is provided—the combination guard and ledger plate assemblies 54 are uniquely constructed. In such regard, attention now is invited to FIGS. 5–7, inclusive, in which it is seen that each combination guard-ledger plate assembly comprises bi-laterally symmetrical halves or counterparts generally designated 56 and 57. Each half carries one portion of the ledger plate 38, whereby each of the halves 56 and 57 has one of the cutting edges 39 and 40. The halves 56 and 57 are adjustably connected together by expansible fastening means which may include a bolt 58 which extends transversely of the longitudinal axes of the halves 59 and 60 of the guard 55 through which said bolt is projected, as clearly illustrated in FIG. 7. A nut mounted on the end of the bolt opposite its head releasably secures the halves 56 and 57 in adjusted positions.

The range of adjustment of the halves 56 and 57 of each combination guard and ledger plate 54 may be optionally varied, and spacers or shims 62, the number and widths of which can be optionally varied, will provide abutments against the outer faces of which the halves 56 and 57 can be secured to rigidify the combination guard-ledger plate construction 54 in adjusted positions.

It is now apparent that should ledger plate 38 adjustment be required to accommodate variation in conventional crop row spacing, only the width of a single of the neck passages 41 and 42 need be affected, as the halves of each ledger plate are independently adjustable, and, accordingly, the widths of the other neck passages need not be affected. Other variations of ledger plate adjustments to efficiently cut stalk crops and the like will be apparent to technicians skilled in the art.

Moreover, assuming that instead of harvesting conventional rows in which plants may be disaligned, the harvester head 11 will harvest a pair of double beds, each of which comprises two rows of plants. Such beds will enter the aisles 22 and 23 to be harvested by cutter devices 24 and 25, respectively, the rows in each bed feeding toward their cutter through a respective of neck passages 41 and 42. To accommodate the spacing between the rows in each double bed, the spacing of which may vary as aforesaid, the corresponding ledger plate 38 may be centered with respect to such double row. Furthermore, the lateral dimensions or widths of the neck passages 41 and 42 may be individually varied by reason of the aforestated construction to provide for selective adjustment calculated to provide maximum crop cutting efficiency. From the foregoing it is appreciated that a conventional two-row harvester may effectively harvest four crop rows.

Each ledger plate 38 is adapted for disposition in a substantially horizontal plane—that is, parallel to the ground surface over which a harvesting vehicle will travel. The guard 55, when mounted, is disposed in a plane which depends normally from the ledger plate 38. The ledger plate 38 has a pair of apertured bi-laterally symmetrical alar extensions 63 and 64 which are hidden in FIGS. 3 and 4 and which are adapted for slidable engagement against the upper surface of the marginal portion 53 of the crop deck or table 26. Said marginal portion 53 has a plurality of apertures (not shown) which extend longitudinally of the longitudinal axis of the deck 26, said apertures being adapted for registration with the apertures in the ledger plate extensions 63 and 64, whereby means of suitable fasteners 66 and 67, as illustrated in FIGS. 5 and 6, the ledger plate halves of the combination structure 54 may be adjustably anchored to the finger bar or marginal portion 53.

The normally aft or rear end portion of the guard halves 56 and 57 carry a pair of alar bosses 68 and 69. The normally upper surfaces of the bosses 68 and 69 are disposed in a plane parallel to and spaced apart from the plane of the lower surface of the ledger plate extensions 63 and 64 by a distance which is substantially equal to the thickness or height of the deck 26, as illustrated in FIG. 7 and in dotted lines in FIG. 4. The bosses 68 and 69 are adapted for sliding engagement with the under surface of the deck 26 and each of the bosses 68 and 69 has apertures which are registerable with deck apertures (not shown), through which fasteners 70 and 71 releasably can be projected to secure bosses 68 and 69 to the deck 26 in laterally adjusted positions.

By reason of the foregoing construction, when it is desired to adjust the halves 56 and 57 of the combination guard and ledger plate assembly 54, the bolt 58 is removed, as are fasteners 66, 67, 70 and 71. Thereafter, the sections 56 and 57 are adjusted to the desired position, or one close thereto, which will permit re-employment of the fasteners 66, 67, 70 and 71, whereafter the spacers or shims 62 are mounted between the sections 56 and 57 in adjusted positions and the bolt 58 replaced and refastened. The forgeoing construction is not only rapidly adjustable, but enables enhanced crop recovery over that available using conventional cutter devices.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. For use in a forage harvesting device adapted for cutting stalk crops and the like, a combination guard and ledger plate construction comprising a ledger plate adapted for fore-to-aft disposition and having sharp normally forwardly converging sides and a flat top, sickle having a toothed section adapted for lateral reciprocation thereon; an integral guard finger disposed in depending relationship with said ledger plate, said ledger plate and integral guard finger characterized by a pair of laterally symmetric halves; means for releasably connecting said halves to a finger support from which said halves are adapted to be projected forwardly, and means for releasably securing said halves in adjusted laterally spaced-apart disposition relative to each other.

2. For use in a forage harvesting device adapted for cutting stalk crops and the like, a combination guard and ledger plate construction comprising a pair of laterally bisymmetrical halves adapted to be releasably secured together in laterally adjustable spaced-apart positions, each of said halves comprising an upper ledger plate part and depending guard portion, the ledger plate part being flat and providing a sickle knife support each half comprising upper and lower spaced anchoring portions adapted for mounting on an associated support in laterally adjusted positions, the ledger plate part having a sloping shearing edge adapted for projection forwardly from said anchoring portions.

3. For use in a forage harvesting device adapted for cutting stalk crops and the like, a combination guard and ledger plate construction comprising means for releasably connecting said combination guard finger and ledger plate in forwardly projecting association with a guard finger support, said combination guard and ledger plate defined by a pair of laterally adjustable bi-symmetrical halves; and means for releasably securing said halves together in laterally adjusted positions.

4. In a mobile harvester for stalk crops and the like, the combination of a guard finger support member having upper and lower surfaces, an integral guard and ledger plate structure having opposite end portions arranged in fore-and-aft relationship, the forward end portion of said integral guard and ledger plate structure defining an upper ledger plate cutter bar support and projecting forwardly from said guard finger support member, a pair of apertured integral mounting bosses co-extensive with and extending rearwardly of said upper ledger plate and secured against the upper surface of said guard finger support member, an integral anchoring member characterized by a pair of wings disposed rearwardly of said ledger plate and secured against the under surface of the guard finger support member; a pair of forwardly converging sides defining said upper ledger plate, and an integral depending cutter guard disposed beneath said ledger plate and said wings, said integral guard and ledger plate structure comprising a pair of laterally by-symmetrical halves releasably secured to each other in adjustably spaced-apart positions.

5. The device defined in claim 4 characterized by first fastening means releasably securing said halves together; replaceable spacer members disposed between said halves and adjusting the spacing therebetween, and second fastening means releasably securing said mounting bosses and said wings to said guard finger support member.

6. A row crop harvester comprising a mobile frame arranged in a fore-to-aft attitude for forward movement in a harvesting path; a pair of laterally spaced-apart row units carried on said frame; said row units having laterally spaced-apart forward members defining a pair of crop-receiving aisles of fore-to-aft disposition in the harvester path; cutter means including a cutter bar supported adjacent the aft end portion of each aisle for reciprocation laterally thereof; laterally reciprocative cutter sections having aft end portions secured to said cutter bar and a forward end portion projected into each of said aisles, means including a ledger plate having forwardly converging shearing sides supported in the aft end portion of each aisle medially of said forward members and providing a flat over which respective of said cutter sections are reciprocated in shearing relationship with said shearing sides, each of said ledger plates together with a pair of respective forward members dividing the aft end portion of each aisle into a pair of necks, and means for adjusting the lateral disposition of each shearing side to vary the width of each neck independently of the adjustment of the others.

7. The device defined in claim 6 further characterized by cutter guard means integral with and depending from each ledger plate, and means for adjusting the lateral disposition of each cutter guard means together with its corresponding shearing side.

8. The device defined in claim 6 further characterized by means providing a finger support member mounted adjacent the aft end portion of each aisle, each ledger plate releasably secured to the finger support member and a cutter guard finger for each ledger plate and having an aft end portion secured to and projecting forwardly from said finger support member.

9. A row crop harvester comprising a mobile frame arranged with aft and forward end portions adapted for forward movement in a harvesting path; a pair of laterally spaced-apart row units carried on said frame, said row units having laterally spaced-apart forward members defining a pair of crop-receiving aisles of fore-to-aft disposition in the harvester path; an elongated flat defining a crop deck supported by said frame and having a pair of laterally spaced recesses co-extensive with and defining the aft ends of said aisles; a cutter device mounted in each of said recesses; a pair of elongated forwardly diverging cutting blades having aft end portions secured to said plate and forward end portions secured to the aft end portions of said forward members and defining the sides of a respective aisle; means including a ledger plate having forwardly converging shearing sides and having an aft end portion secured to said crop deck and a forward end portion projecting into each recess medially of said cutting blades, each of said ledger plates together with a pair of respective cutting blades dividing the aft-end portion of each aisle into a pair of crop-receiving necks; cutter means including a cutter bar supported for lateral reciprocation adjacent said deck; a pair of laterally reciprocative cutter sections carried by said cutter bar and projecting forwardly therefrom, said cutter sections being reciprocative against the ledger plates respectively for shearing against said shearing sides, and means for adjusting the lateral disposition of each shearing side to vary the width of each neck independently of the adjustment of the others.

10. In a harvester of the class characterized by a frame, and a cutter device mounted on said frame for disposition in a harvesting path and having a pair of relatively reciprocative shearing components, one of said shearing components having two crop shearing means adjustable toward and away from each other and both adjustable relative to the other of said shearing components to vary the position at which crops will be cut during harvesting.

11. In a harvester of the class having a relatively stationary cutting member presenting angularly sloped shearing edges and a relatively movable cutting member having angularly disposed shearing edges movable in a path for cutting crops against said relatively stationary cutting member one of said cutting members having separable parts adjustable lengthwise of said path for varying the distance between the shearing edges of said one of said cutting members to adjust the position at which crop shearing occurs with the shearing edges of the other member.

12. In a harvester of the class having a frame, a sickle on said frame adapted for reciprocating action on a line transversely of a harvesting path and having at least one cutting section with lateral cutting edges, cooperative cutter means disposed in shearing relationship with said sickle and including ledger plate means having a pair of laterally adjustable shearing portions with lateral cutting edges and supported by the frame for adjustment laterally toward and away from each other longitudinally of said line of reciprocation of the sickle whereby the position of crop cutting between the section on the sickle and the shearing portions transversely of a harvesting path can be varied.

13. A row crop harvester comprising a mobile frame arranged for forward movement in a harvesting path; a pair of laterally spaced-apart row units carried on said frame, said row units having laterally spaced-apart forward members defining a pair of front to rear extending crop-receiving passages; a substantially similar cutter device mounted in the rear portion of each of said passages; a support extending transversely of and disposed at the rear ends of said passages; a separable ledger plate and cutter guard assembly comprising separable counterparts secured for lateral adjustment on said support and including forward end portions projected forwardly into its respective passage and subdividing a respective passage into segments of variable lateral dimensions; a cutter bar mounted for lateral reciprocation adjacent said support; cutter sections carried by said cutter bar and reciprocative in shearing association with the ledger plates of each assembly.

References Cited

UNITED STATES PATENTS

| 2,484,652 | 10/1949 | Schoenrock | 56—309 |
| 2,490,261 | 12/1949 | Gable | 56—311 |
| 2,984,962 | 5/1961 | Heisins | 56—102 |
| 3,098,338 | 7/1963 | Myers | 56—296 |
| 3,213,597 | 10/1965 | Procter | 56—16 |

ANTONIO F. GUIDA, *Primary Examiner.*